(12) United States Patent
Reed

(10) Patent No.: US 8,925,259 B2
(45) Date of Patent: Jan. 6, 2015

(54) ADJUSTABLE UNIVERSAL SCREED GUIDE/CONTROL JOINT CLIP SYSTEM

(71) Applicant: William F. Reed, Holmdel, NJ (US)

(72) Inventor: William F. Reed, Holmdel, NJ (US)

( * ) Notice: Subject to any disclaimer, the term of this patent is extended or adjusted under 35 U.S.C. 154(b) by 0 days.

(21) Appl. No.: 13/998,730

(22) Filed: Dec. 2, 2013

(65) Prior Publication Data

US 2014/0150356 A1 Jun. 5, 2014

(51) Int. Cl.
*E04G 1/22* (2006.01)
*E04B 1/41* (2006.01)
*F16B 9/02* (2006.01)

(52) U.S. Cl.
CPC .............. *E04B 1/4114* (2013.01); *F16B 9/023* (2013.01); *F16B 9/026* (2013.01)
USPC ............................................ 52/126.7; 52/301

(58) Field of Classification Search
CPC ................... E04F 15/02452; E04F 15/02464; E04C 5/162
USPC .............. 52/126.7, 301, 300, 741.1, 698, 689
See application file for complete search history.

(56) References Cited

U.S. PATENT DOCUMENTS

| | | | | |
|---|---|---|---|---|
| 5,613,336 | A | * | 3/1997 | Workman ........................ 52/301 |
| 5,826,398 | A | * | 10/1998 | Carnicle .......................... 52/698 |
| 5,946,871 | A | * | 9/1999 | Kassardjian et al. ........... 52/301 |
| D416,630 | S | * | 11/1999 | Schimmelpfennig et al. .............................. D25/135 |
| 6,073,415 | A | * | 6/2000 | Carnicle ........................... 52/698 |
| 6,085,478 | A | * | 7/2000 | Workman ........................ 52/301 |
| 6,662,514 | B2 | * | 12/2003 | Workman ........................ 52/300 |
| 6,745,530 | B2 | * | 6/2004 | Nesbitt ............................ 52/301 |
| 7,716,898 | B1 | * | 5/2010 | Dunn .............................. 52/689 |

* cited by examiner

Primary Examiner — Basil Katcheves
(74) Attorney, Agent, or Firm — Clifford G. Frayne

(57) ABSTRACT

An adjustable, universal screed guide/control joint clip for positioning screed guide/control joints utilized in the placement of concrete in concrete slabs, the adjustable universal screed guide clip allowing for the exact adjustment of the height of the screed guide attached thereto for the placement of the concrete slabs, the adjustable universal screed guide clip allowing the installation of the screed guide in applications heretofore not allowable, the adjustable, universal screed guide/control joint clip capable of accommodating both large and small profile screed guides.

14 Claims, 6 Drawing Sheets

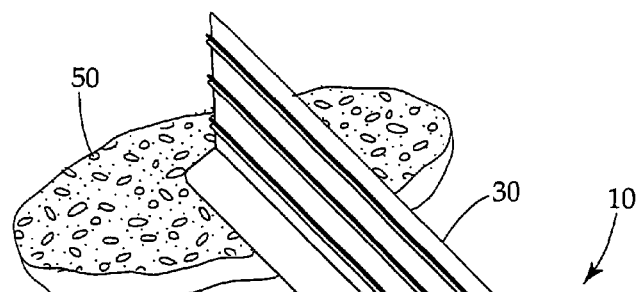
Fig. 2
Prior Art
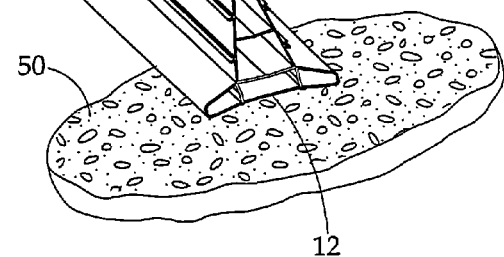
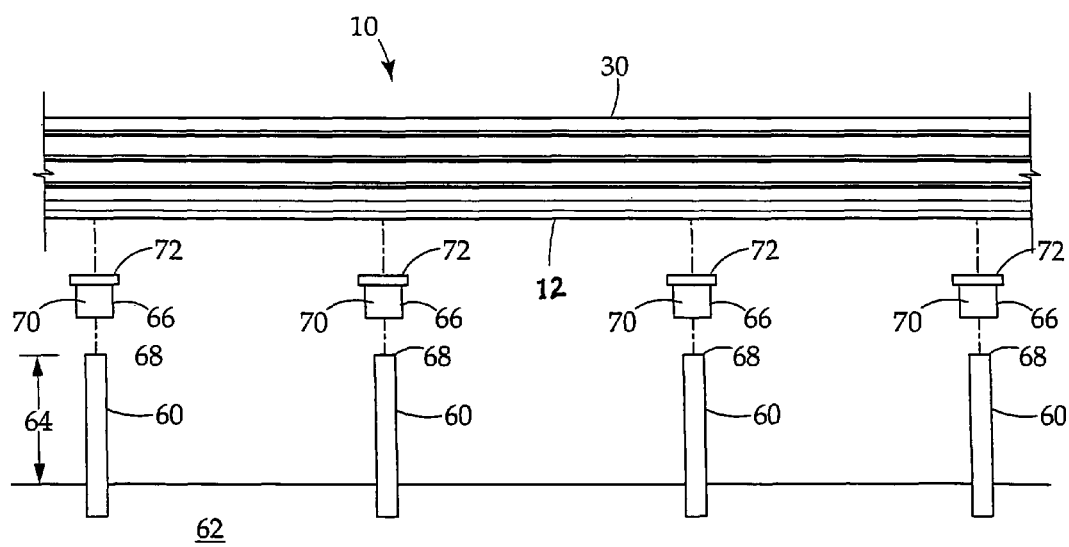
Fig. 3
Prior Art

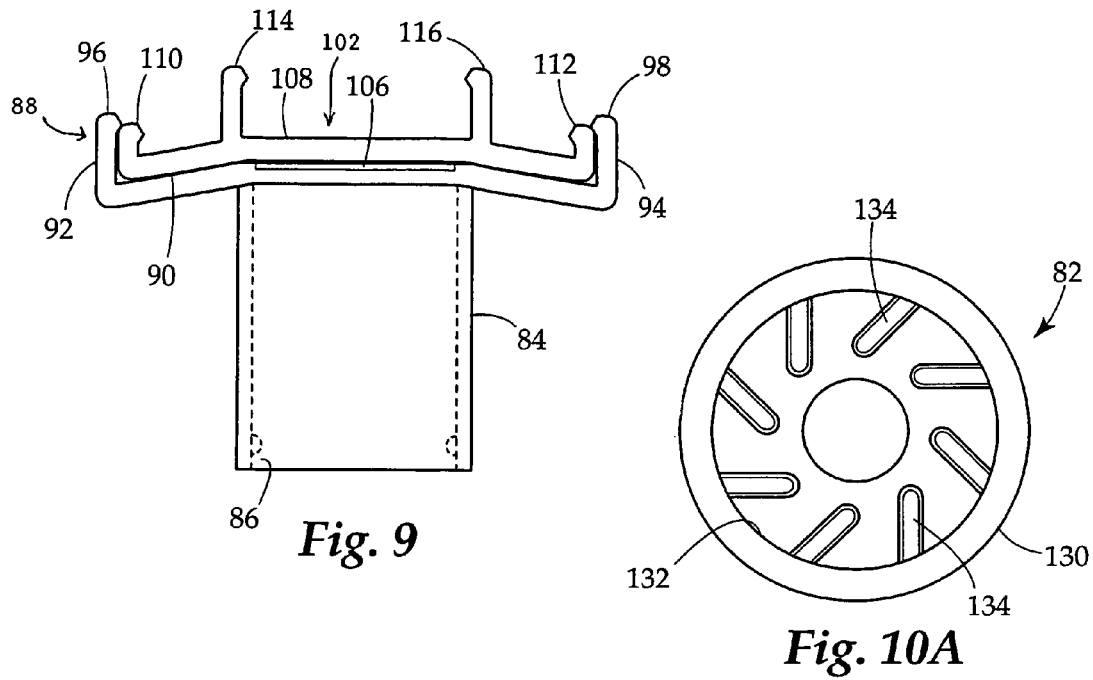
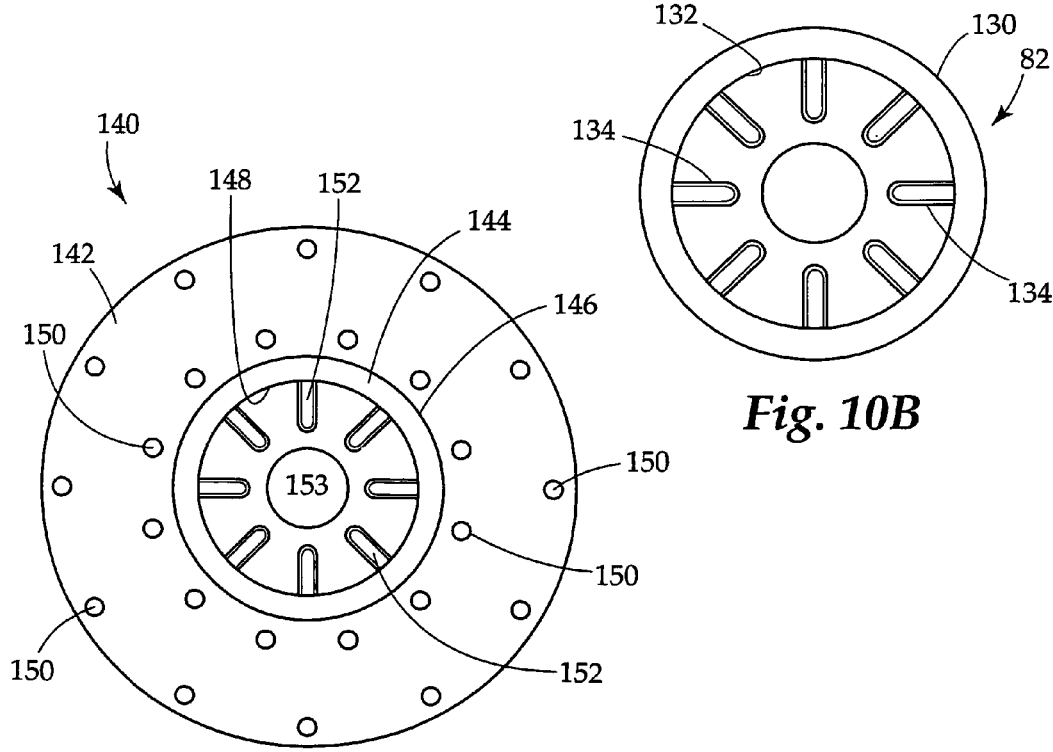

ADJUSTABLE UNIVERSAL SCREED GUIDE/CONTROL JOINT CLIP SYSTEM

BACKGROUND OF THE INVENTION

1. Field of the Invention

The present invention relates to an adjustable, universal screed guide/control joint clip used in the positioning of screed guide/control joints, which in turn are utilized in the placement of concrete in concrete slabs, the screed guides provide precise placement of the concrete in concrete slabs, the adjustable, universal screed guide clip allowing for exact adjustment of the height of the screed guide, as well as allowing the installation of the screed guide in applications heretofore denied.

2. Description of the Prior Art

The pouring and use of concrete is a fundamental construction task in the trade. It is referred to as the placement of concrete. It is often required in the installation of sidewalks. It is placed over steel decks to provide the flooring base for multi-story skyscrapers; it is placed for the flooring of large warehouse or industrial structures; and it is placed to form the basis for water retention basins and reservoirs. It further provides the basis for highway surfaces and airport runways.

There are two essential joints associated with concrete slabs. The first joint is commonly referred to as the expansion joint and passes completely through the concrete slab. The expansion joint is designed to allow for the expansion and contraction of the concrete slab in response to ambient temperature conditions. The second joint is commonly referred to as the control joint. The control joint is a linear impression formed in the concrete slab after its placement. It does not extend through the concrete slab. The purpose of the control joint is to control the direction of any cracking which may appear in the slab over time. Typical control joints would run transversely on the slab from one edge to the other. Control joints would normally be formed by dragging a trowel across the poured concrete while it was still wet to form the linear impression, and in some instances, diamond saws would be used to form the control joints after the concrete slab had hardened.

In the prior art, any handy material would be utilized to form the peripheral outline or frame of the concrete slab and any associated expansion joints. The concrete would be placed within the frame and leveled using a screed which would be dragged across the surface of the wet concrete while resting on at least two adjacent or abutting framing members in order to achieve a planar level slab. The framing members upon which the screed rested while leveling the surface of the concrete slab are referred to in the trade as screed guides.

European building codes require a ten year guarantee with respect to poured concrete slabs. No such guarantee is required or exists in US building codes. This dichotomy has led to greater technical advances in Europe with respect to the pouring of concrete slabs. In particular, a screed guide profile has been developed in which the screed guide itself also forms the control joint for the concrete slab. The use of these combination screed guide/control joints presents some great advantages in the area of placement of concrete slabs and in the life expectancy of the concrete slabs. However, the accurate placement of the screed guide/control joints sometimes proved laborious and time consuming.

Initially, some screed guide/control joints were positioned by pouring small mounds of concrete in a desired linear direction before positioning of the screed guide/control joint. The screed guide/control joint would then be positioned on the small mounds of concrete to the desired height, and the mounds of concrete would be allowed to set. Once the mounds of concrete had set, securing the screed guide/control joint, the concrete slab would be poured to the height of the upper edge of the screed guide/control joint. This method became laborious and time consuming since normally 24 hours would have to elapse from the time that the mounds of concrete were poured until the time that the slab could be poured to allow for the mounds to set and position the screed guide/control joint.

The method of installing screed guide/control joints evolved to the use of rebar stakes, and clips. The section of rebar would be pounded into the ground to an estimated height, each rebar being positioned approximately two feet apart. Clips would then be installed on the top of the rebar, the upper portion of such clips presenting a dove tail channel into which a preformed plastic screed guide/control joints having a pyramidal cross section would snap fit. The worker would hand adjust the depth of the rebar in order that the clips were at the same height so that the screed guide/control joint presented a level upper edge for placement of the concrete slab. This method presents problems when a vapor barrier is utilized, since the rebar stakes will pierce the plastic sheets or other types of vapor barriers and degrade their performance. It also presents a problem when concrete flooring is being placed on a steel deck as is done in the construction of multi-story buildings or skyscrapers. The rebar stake cannot be driven into or through the steel deck.

It presents an additional problem in those instances where concrete slabs are being placed onto compacted gravel subgrade or ground. Some installations call for void forms to be placed beneath the concrete slab at various locations to compensate for the expansion and contraction of the ground due to expansion and contracting soil conditions. These voided areas are formed utilizing cardboard housings which are positioned prior to the placement of the concrete slab, the slab being placed essentially over the cardboard encapsulating the cardboard housing between the concrete and the ground. The void area under the cardboard housing and in contact with the ground provides compensation for expansion and contraction of the ground. The cardboard housing over time will eventually deteriorate, but the void will remain. The use of the rebar stakes or any stake on such a slab would pierce the cardboard housing and obviate its desired purpose of forming a void between the poured concrete and the ground.

An additional problem associated with the current installation of screed guide/control joints is that the profile of the screed guide/control joint varies depending on the thickness of the concrete slab. Two sizes of screed guide/control joint profiles are currently used for screed guide/control joint placement in various thicknesses of concrete slabs. A large profile screed guide/control joint is utilized for placement of six inches or greater, and a small profile screed guide/control joint is used for placements of lesser thickness. Since the size of the screed guide/control joints vary, the installer must inventory a quantity of clips that will fit the two profiles.

This screed guide profile and the advantages thereof would find greater acceptance both in Europe and the US if the aforesaid disadvantages could be overcome. Applicant's system addresses and overcomes each disadvantage.

OBJECTS OF THE INVENTION

An object of the present invention is to provide a novel screed guide/control joint clip system to accelerate and facilitate the accurate placement of the screed guides and limit the use of different sizes of clips.

A further object of the present invention is to provide for a novel screed guide/control joint clip system which allows for the facile and exact adjustment of the height of the screed guide/control joint clip and the screed guide/control joint.

A still further object of the present invention is to provide for a novel screed guide/control joint clip system which permits the use of the system on substrates which heretofore would not accept the system.

A still further object of the present invention is to provide for a novel screed guide/control joint clip system which incorporates a base member securable to a substrate of the type which did not previously permit the usage of a screed guide/control joint.

SUMMARY OF THE INVENTION

An adjustable, universal screed guide/control joint clip for positioning screed guide/control joints utilized in the placement of concrete in concrete slabs, the adjustable universal screed guide clip allowing for the exact adjustment of the height of the screed guide attached thereto for the placement of the concrete slabs, the adjustable universal screed guide clip allowing the installation of the screed guide in applications heretofore not allowable, the adjustable, universal screed guide/control joint clip capable of accommodating both large and small profile screed guides.

BRIEF DESCRIPTION OF THE DRAWINGS

These and other objects of the present invention will become apparent, particularly when taken in light of the following illustrations wherein:

FIG. 2 is a perspective view of the screed guide/control joint of FIG. 1 illustrating a prior art method of installation;

FIG. 3 is an exploded perspective view of the screed guide/control joint of FIG. 1 and a second prior art method of installation;

FIG. 9 is an end view of the screed guide/control joint clip of the present invention in orientation for receipt of a low profile screed guide/control joint;

FIGS. 10A and 10B are bottom views of the threaded cap rebar engaging member illustrating two embodiments of the orientation of internal ribbing to accommodate various diameter rebar;

FIG. 11 is a top view of a base member allowing use of the screed guide/control joint clip system on vapor barriers, steel substrate and void forms;

DETAILED DESCRIPTION OF THE INVENTION

Figure 1:
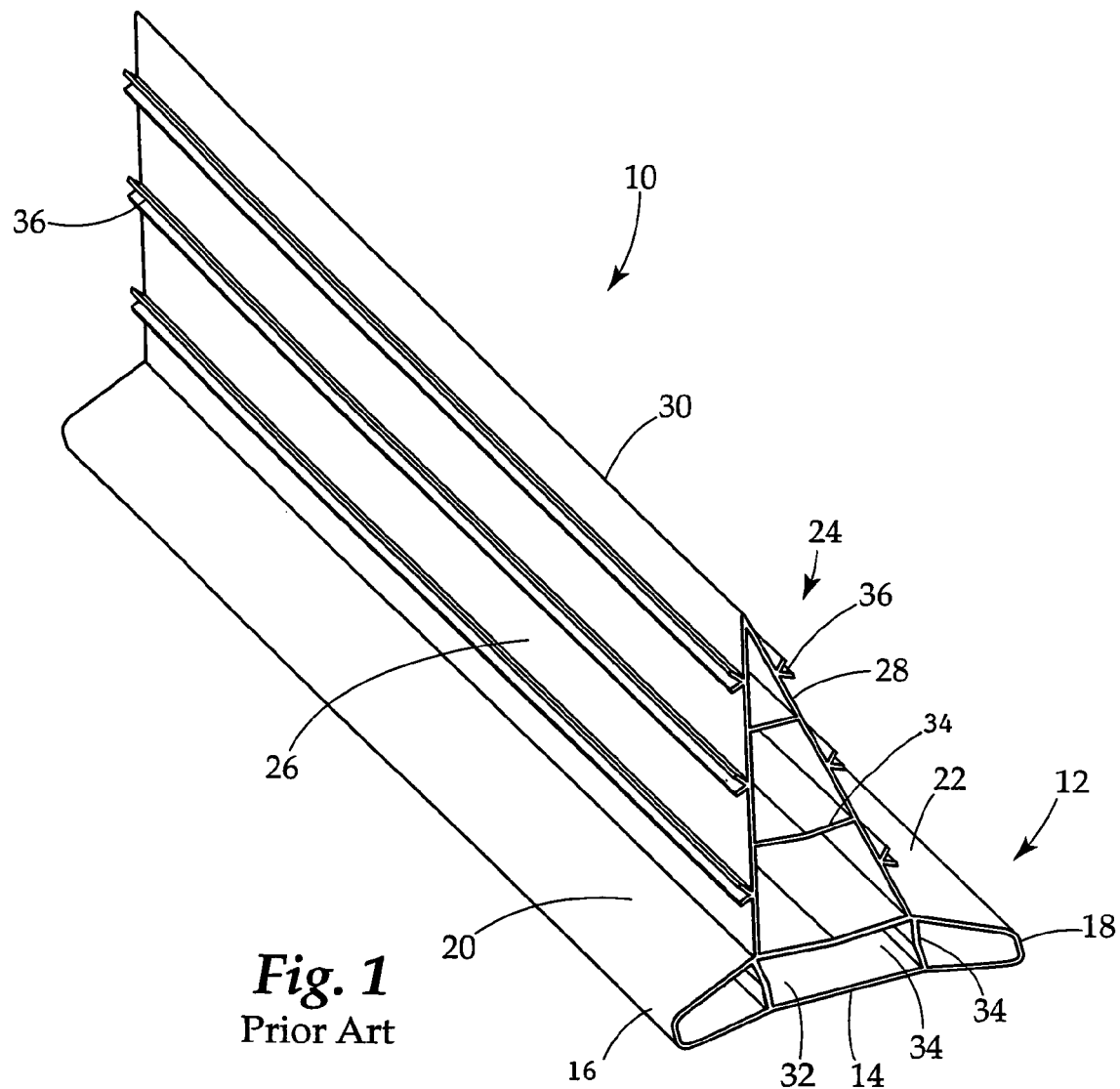
FIG. 1 is a perspective view of a screed guide/control joint utilized with the present invention.

FIG. 1 is a perspective view of a screed guide/control joint utilized in the present invention. The screed guide/control joint 10 is linear in shape generally coming in 12 to 16 foot lengths to be cut in the field to the desired length required. It is formed of extruded polymer and has a base portion 12 comprised of a bottom wall 14, two opposing side walls 16 and 18, angled upper walls 20 and 22 terminating in an upwardly extending tower portion 24, triangular in cross section formed by two angled side walls 26 and 28 and terminating in an apex which forms the upper edge 30 of screed guide/control joint 10. The interior 32 of the base and tower portions are formed during the extrusion process with cross member ribs 34 for support. Additionally, the angled side walls 26 and 28 of tower portion 24 may also be formed with longitudinal parallel ribs 36 to aid in the setting process when screed guide/control joint 10 is encapsulated in concrete.

In most instances, the bottom wall 14 of the base member is not planar, but rather, slightly flared downwardly at its side walls 16 and 18 to aid in its snap fitting with a screed guide/control joint clip as described hereafter.

It should also be noted that FIG. 1 illustrates the general shape of the screed guide/control joint used with the present invention, however, minor variations, particularly with the longitudinal ribs on the exterior of the tower, may vary from manufacturer to manufacturer. It should also be pointed out that screed guide/control joints generally are formed in two sizes, large profile and small profile. The small profile screed guide/control joints are used with concrete slabs up to six inches in depth, and the large profile screed guide/control joints are used for slabs in excess of six inches in depth. The large profile and small profile screed guide/control joints are similar in all aspects except their dimensions. A typical large profile screed guide/control joint would have a base portion with slightly over two inches and a tower portion height of approximately three to three and a half inches, whereas the small profile screed guide/control joint dimensions would be approximately half those of the large profile screed guide.

FIG. 2 is a perspective view of screed guide/control joint 10 of FIG. 1 illustrating its setting with respect to a prior art method of installation. In this method of installation, small mounds of concrete 50 are poured in a linear orientation approximately two feet apart so that the base portion 12 of the screed guide/control joint may be set on these concrete mounds and the mounds allowed to harden and secure the screed guide/control joint. Once set, the concrete slab would be placed, encapsulating the entire length of the screed guide/control joint to the height of its upper edge 30. Depending upon the area of concrete to be placed, a plurality of screed guide/control joints would be set in this manner, the desired distance apart in accordance with code, in order to define the area of concrete to be placed. This method of setting the screed guide/control joint is very time consuming, laborious, and requires exacting measurements to ensure that upper edge 30 is at a consistent height along the length of the screed guide/control joint and on all similarly situated screed guide/control joints.

The desire is to obtain a concrete slab of some dimension which has a uniform planar upper surface. To that end, the initial concrete mounds 50 that are placed must be of the desired height and the screed guide/control joint must be set at the accurate height, as well as all parallel and abutting screed guide/control joints to insure that the upper edge 30 of all of the screed guide/control joints utilized to define the concrete slab are at the same height. This can best be described as a hit or miss method of obtaining a uniform planar concrete slab.

FIG. 3 is an exploded perspective view of the screed guide/control joint of FIG. 1 and an alternative method for installation developed in the prior art. In this configuration a plurality of lengths of rebar 60 are driven into the underlying substrate 62 to a desired height 64. The rebar is installed in a linear orientation approximately two feet apart. A screed guide/control joint clip 66 is then frictionally positioned on the upper extended end 68 of the rebar 60. The screed guide/control joint clip 66 comprises a tubular base 70 which slidably engages the upper end 68 of the rebar 60. Unitarily formed to the upper end of tubular base 70 is a dove tail channel 72. Dove tail channel 72 is dimensioned to the width of the base portion 12 of screed guide/control joint 10.

The installer would adjust the height of the sections of rebar 60 by hand to insure that the screed guide/control joint clips 66 were all at the same height. The screed guide/control joint would then be snap fit into the dove tail channel 72 of the screed guide/control joint clip, thus securing the screed guide/control joint at a desired height above the substrate 62. The installer would take measurements to insure that the upper edge 30 of all screed guide/control joints 10 utilized and placed in order to place the concrete slab were all at the same height. The concrete would then be placed encapsulating the rebar 60, the screed guide/control joint clip 66 and the screed guide/control joint 10 to the height of its upper edge 30. Sections of the concrete slab would be placed in succession between each screed guide/control joint so positioned.

This method, while an improvement over the use of small poured concrete mounds, still required checking by the installer to insure that the upper edges 30 of all of the screed guide/control joints 10 were at the same level, and required multiple adjustments of the height of the rebar, since the screed guide/control joint would not snap fit and lock into the dove tail channel 72 of the screed guide/control joint clip 66 unless all screed guide/control joint clips 66 were at the same height.

Applicant's screed guide/control joint clip provides several advantages over the prior art. First, it can accommodate both large profile and small profile screed guide/control joints in one clip assembly. Secondly, its construction allows for a firm grip on both European rebar which measures approximate 12 mm in diameter, and US rebar, which is slightly larger at 12.57 mm. Thirdly, the interior member which is exteriorly threaded easily allows for the accurate height adjustment of the screed guide/control joint clip to insure that the upper edges of all screed guide/control joints are level when installed on the screed guide/control joint clip. Lastly, the incorporation of a base support member cooperable with the rebar, allows for the use of screed guide/control joints where vapor barriers and liners are initially installed over the substrate, allows for the use of Applicant's screed guide/control joint clip in conjunction with screed guide/control joints on steel substrate for multi-story skyscrapers, and allows for the use of screed guide/control joints on void forms. All of these areas were previously denied the use of screed guide/control joints because of the required installation methods previously discussed.

Figure 4:
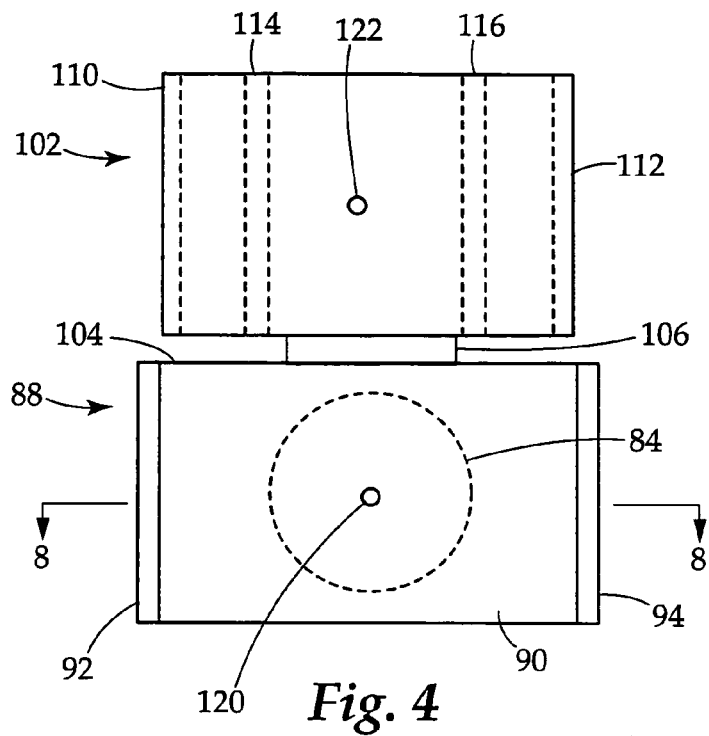
FIG. 4 is a top view of the screed guide/control joint clip of the present invention.
Figure 5:
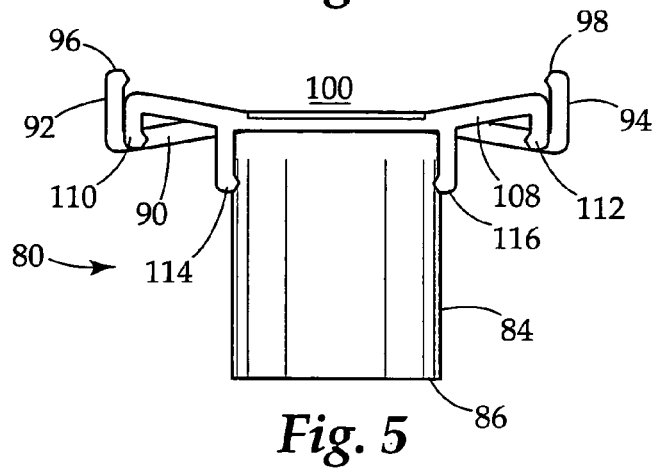
FIG. 5 is an end view of the screed guide/control joint clip of the present invention.
Figure 6:
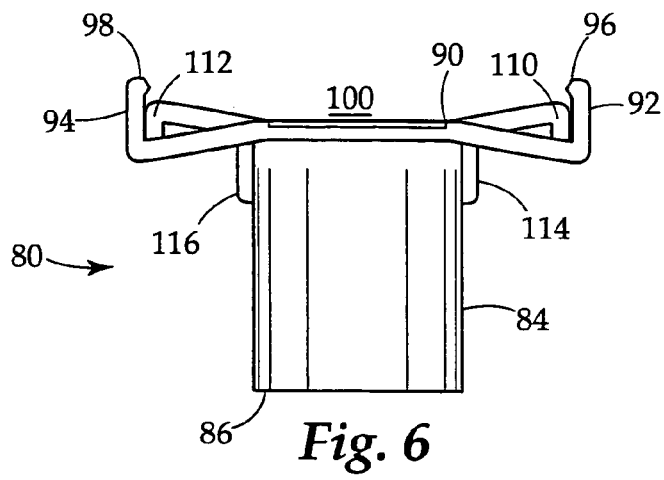
FIG. 6 is a side view of the screed guide/control joint clip of the present invention.

FIG. 4 is a top view of the screed guide/control joint clip of the present invention, FIG. 5 is an end view of the screed guide/control joint clip of the present invention, and FIG. 6 is an opposing end view of the screed guide/control joint clip. The screed guide/control joint clip 80 cooperates with a threaded cap rebar engaging member 82 illustrated in FIG. 7, which will be more fully discussed hereafter. Screed guide/control joint clip 80 comprises a tubular member 84 having an internal bore 86, internal bore 86 having a single threaded member 88 cooperable with threaded cap rebar engaging member 82 as more fully discussed with respect to FIG. 8 hereafter. Unitarily formed with tubular member 84 is a first dove tail channel member 88 having a base portion 90 and two opposing upstanding side walls or prongs 92 and 94, upstanding side walls or prongs 92 and 94 being slightly inwardly protruding at their upper terminus 96 and 98 to define a channel 100 for engagement with the base member 12 of a large profile screed guide/control joint 10 snap fit there between.

A second inverted dove tail channel member 102 is unitarily hingeably secured 106 to an open edge 104 of first dove tail channel member 88. Second, inverted dove tail channel member 102 in the configuration illustrated in FIGS. 4, 5, and 6 has a base member 108, and depending outer side walls or prongs 110 and 112. Second inverted dove tail channel member 102 also has the two inner side walls or prongs 114 and 116 spaced apart from outer side walls or prongs 110 and 112 depending downwardly and terminating with a nubbed apex similar to the side walls of first dove tail channel member 88. The distance between the downwardly depending inner side walls or prongs 114 and 116 corresponds to the width of the base of a small profile screed guide/control joint.

Referring to FIG. 9, which is an end view of the screed guide/control joint clip of FIGS. 4, 5, and 6 with the second dove tail channel member 102 in hinged relationship with the first dove tail channel member 88. The flexible hinge 106 allows for second dove tail channel member 102 to be rotated 180 degrees such that its outer side walls or prongs 110 and 112 frictionally lock in a snap fit manner with the side walls or prongs 92 and 94 of first dove tail channel member 88. This positions the inner side walls or prongs 114 and 116 of second dove tail channel member 102 in a central upwardly extending position converting the screed guide/control joint clip 80 from one accommodating a large profile screed guide/control joint to one which can now accommodate a low profile screed guide/control joint, thus the elimination of two separate sized clips for the installation and pouring of concrete.

It will be noted that the base members 90 and 108 of first and second dove tail channel members 88 and 102 are not planar, but are slightly arcuate to accommodate the contour of the base member 12 of either a large profile or small profile screed guide/control joint. Additionally, the base members 90 and 108 of first and second dove tail channel members 88 and 102 may also be formed with apertures 120 and 122 to aid in the molding process.

Figure 7:
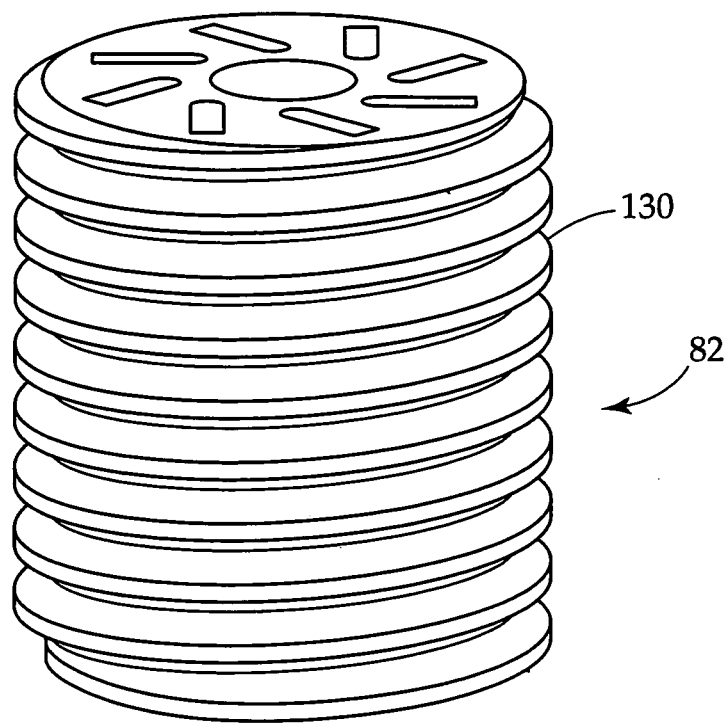
FIG. 7 is a perspective view of the threaded cap rebar engaging member.

FIG. 7 is a perspective view of threaded cap rebar engaging member 82. FIGS. 10A and 10B are bottom views of two embodiments of threaded cap rebar engaging member 82. Threaded cap rebar engaging member 82 is tubular having an exterior threaded surface 130 and an interior surface 132 having a plurality of radial or non-radial ribs 134 protruding inwardly from inner surface 132. The ribs 134, being non-radial in orientation with respect to tubular threaded cap rebar engaging member 82 allows for threaded cap rebar engaging member 82 to be utilized with respect to both European and United States rebar dimensions, thus allowing for threaded cap rebar engaging member to be snap fittingly engaged over an end of either type of rebar. Radial ribs may also be used but sized accordingly for the size of rebar utilized.

Figure 8:
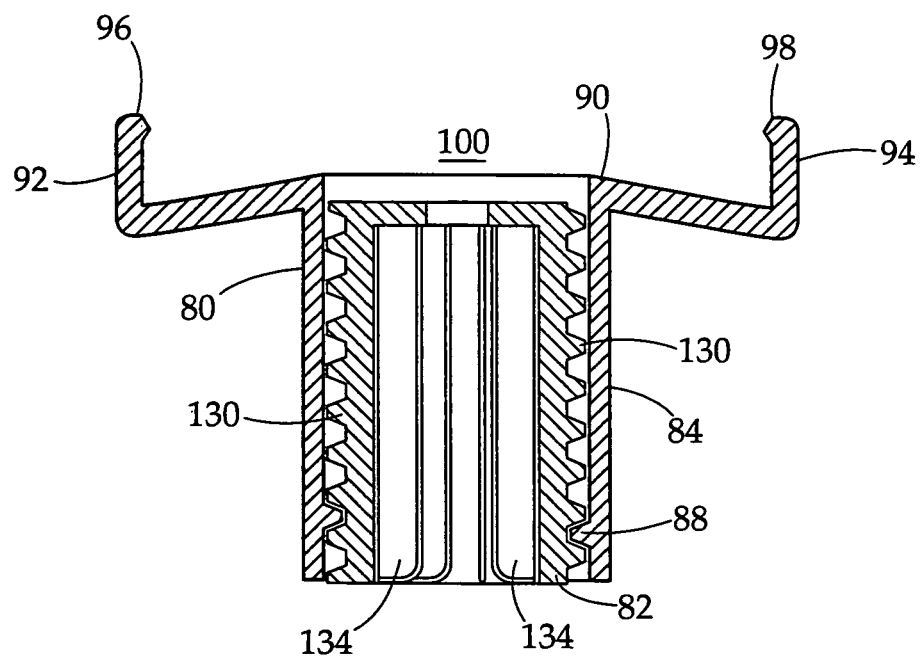
FIG. 8 is a cross sectional view of the screed guide/control joint clip and threaded cap rebar engaging member along Plane 8-8 of FIG. 4.

FIG. 8 is a cross sectional view of the screed guide/control joint clip and threaded cap rebar engaging member along Plane 8-8 of FIG. 4. Screed guide/control joint clip 80 has a single internal thread 88 cooperable with the external threading 130 on threaded cap rebar engaging member 82 to allow for the height adjustment of the screed guide/control joint clip 80 once the threaded cap rebar engaging member 82 has been snap fit over an end of rebar. This allows screed guide/control joint clip 80 to be accurately rotated on threaded cap rebar engaging member 82 to achieve the desired height.

The screed guide/control joint clip system described thus far eliminates the need for concrete mounds to be poured and measurements to be taken with respect to the placement of screed guides on such concrete mounds. It also eliminates the eyeball measurements and adjustment of the depth of rebar in the substrate in order to achieve equality in screed guide levels. The addition of a base member to a system previously described, also allows for the use of the system in those instances where a liner or vapor barrier is required over the substrate or where the substrate is steel, and also where conditions require that void forms be provided in the concrete slab for the underlying expansion and contraction of the substrate.

Figure 12:
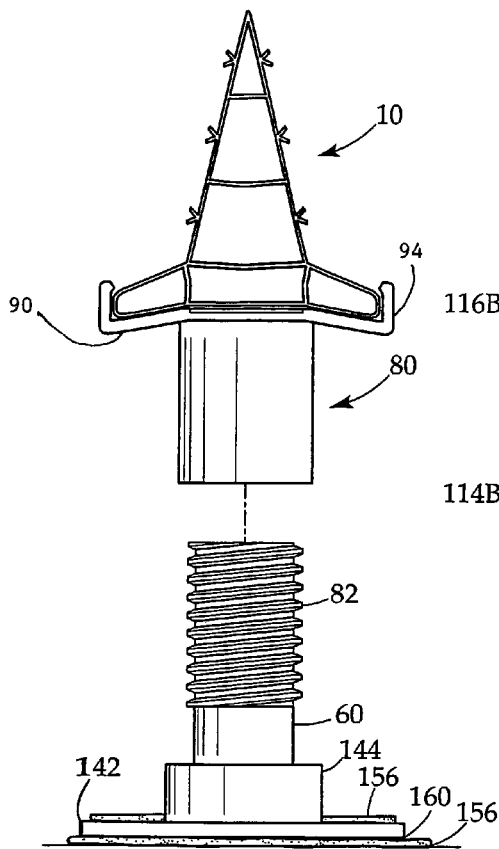
FIG. 12 is a side view of the system installed on a steel substrate.

FIG. 11 is a top view of a base support member 140 designed to be utilized with the screed guide/control joint system, and FIG. 12 is a side view of the base member with the screed guide/control joint clip system installed on a steel substrate. The base member 140 comprises a planar base 142 of any particular geometric shape, but illustrated as being circular in FIGS. 11 and 12. Centrally positioned on planar base 142 and unitary therewith is upstanding tubular member 144 having an outer side wall 146 and an inner side wall 148 there being a plurality of radial or non-radial rib members 152 extending inwardly from the inner side wall 148. Positioned about the planar base 142 would be a plurality of apertures 150 extending through planar base 142. Additionally there may be a central aperture 153 through planar base 142 positioned within tubular member 144.

In this configuration, an appropriate adhesive 156 would be applied to either the substrate 158 or the undersurface 160 of planar base 142 and base member 140 would then be positioned on the substrate 158. The application of the adhesive 156 would be such that it would adhere the under surface 160 of base member 142 and to the substrate, but would also pass through or ooze through the various apertures 150 and 153 in the planar base so as to extend to the upper surface of planar base 142 thus insuring firm adhesion of base member 140 to the substrate 158, be it steel, vapor barrier, or cardboard void forms.

An appropriate length of rebar 60 would then be engaged in tubular member 144 and rigidly maintained by the rib members 152 extending therein. The installer would secure base members 140 in this fashion at the required distances on the substrate. The installer would then snap fit a threaded cap rebar engaging member 82 onto each piece of rebar 60, and threadedly secure and adjust screed guide/control joint clip 80 to the threaded cap rebar engaging member 82 such that the heights of the base members 90 or 108 of the dove tail channel members 88 or 102 would be equal. Screed guide/control joints would then be snap fit and installed to the screed guide/control joint clips 80 and concrete would be placed encapsulating the base member 140, the rebar 60, the rebar engaging member 82, the screed guide/control joint clip 80, and the screed guide/control joint 10.

Figure 13:
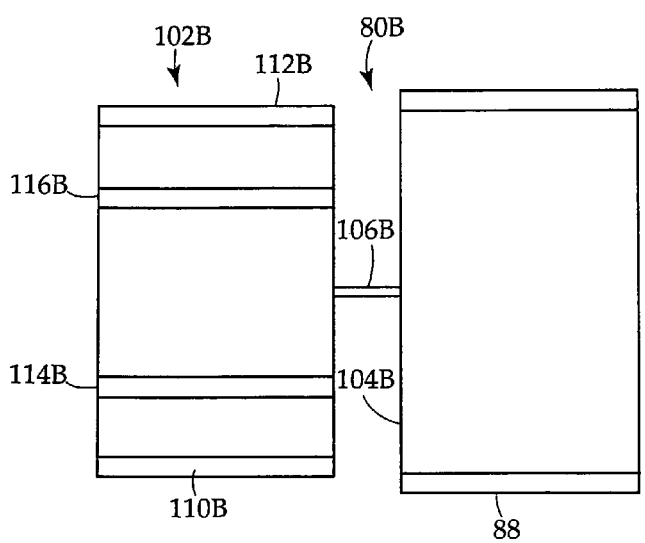
FIG. 13 is a top view of a second embodiment of a screed guide/control joint clip of the present invention.
Figure 14:
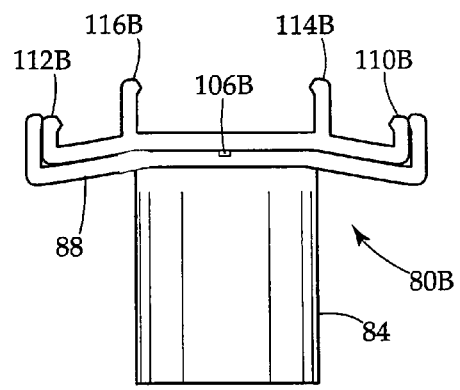
FIG. 14 is an end view of the second embodiment of the screed guide/control joint clip illustrated in FIG. 13.

FIG. 13 is a top view of a screed guide/control joint clip 80B similar to the screed guide/control joint clip 80 illustrated in FIG. 4, and FIG. 14 is an end view of screed guide/control joint 80B from end. Screed guide/control joint clip 80B has a similar tubular member 84, having an internal bore 86, internal bore 86 having a single threaded member 88 cooperable with the threaded cap rebar engaging member 82 as discussed with respect to FIG. 8. Screed guide/control joint clip 80B also has an identical first dovetail channel member 88.

A second dovetail channel member 102B is unitarily secured to open edge 104B of first dovetail channel member 88 by means of a flexible hinge arm 106B. Second dovetail channel 102B is identical to the second dovetail channel member 102 as illustrated in FIG. 4 with the exception that it is not inverted. Flexible hinge arm 106B is of sufficient length to allow second dovetail channel member 102B to be twisted or turned 180 degrees in a plane allowing for outer side walls or prongs 110B and 112B to be snap fit or inserted into first dovetail channel member 88 such that the two inner side walls or prongs 114B and 116B are in position for receipt of a small profile screed guide. Flexible arm 106B eliminates the hinge 106 illustrated in FIG. 4 and presents an alternative manner for the production of the screed guide control joint clip.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. An adjustable, universal clip for positioning and leveling a large profile or small profile screed control guide joint for the placement of concrete, said screed control guide joint formed of extruded polymer and having a base, an upward standing ridge of triangular cross section terminating in an upper linear edge, said adjustable, universal clip comprising:
   an exterior threaded tubular cap member having a plurality of internal ribs, said exterior threaded cap member frictionally engageable with an upstanding end portion of rebar positioned in a substrate;
   a clip member having a tubular base having an internal thread rotatable engageable with said exterior threaded cap member, said tubular base having a unitarily formed first dove tail channel formed on an upper surface, said first dove tail channel formed of a base and opposing upstanding edges defining said dove tail channel, said dove tail channel dimensioned to snap fittingly receive a base of a large profile screed control guide joint;
   a second dove tail channel secured to said base of said first dove tail channel, said second dove tail channel having a base and opposing upstanding edges snap fittingly engageable in said first dove tail channel, said second dove tail channel having opposing interior upstanding prongs dimensioned to snap fittingly receive a small profile screed control guide joint;
   a plurality of said exterior threaded tubular cap members, upstanding end portions of said rebar, and said clip members arranged in a linear orientation to a substrate in order to snap fittingly receive a screed control guide joint length of either large profile or small profile.

2. The adjustable universal clip in accordance with claim 1 wherein said second dovetail channel secured to said base of said first dovetail channel is hingeably secured to said base of said first dovetail channel with said opposing upstanding edges and opposing interior upstanding prongs oriented downwardly, said second dovetail channel hingeably rotated 180 degrees to engage said first dovetail channel.

3. The adjustable universal clip in accordance with claim 1 wherein said second dovetail channel secured to said base of said first dovetail channel is secured by an elongate flexible hinge arm wherein said second dovetail channel and said opposing edges and said opposing interior upstanding prongs are oriented upwardly, said elongate hingeable arm permitting planar rotation of 180 degrees in order to engage said first dovetail channel.

4. The adjustable universal clip in accordance with claim 1 wherein said plurality of internal ribs on said exterior threaded tubular cap member are radially oriented within said threaded tubular cap member.

5. The adjustable universal clip in accordance with claim 1 wherein said plurality of internal ribs within said threaded tubular cap member are non-radial in orientation within said threaded tubular cap member.

6. The adjustable universal clip in accordance with claim 1 wherein said clip member is rotatably adjustable on said exterior threaded tubular cap member for adjustment of height of said clip member for receipt of a screed control guide joint length of either large profile or small profile.

7. The adjustable universal clip in accordance with claim 1 wherein said end portion of rebar frictionally engageable with said exterior threaded tubular cap member is supported by a substrate engaging base member, said substate engaging base member having a planar support base having an upper surface and a lower surface there being disposed between said upper and lower surface a plurality of apertures, there being positioned on said upper surface and unitary therewith, a tubular upstanding support tube for the receipt of a lower end of said rebar, said support base secured to said substrate by an adhesive applied to the lower surface of the support base or to the substrate, in a quantity such that sets adhesive flows through said plurality of apertures and adheres to and encapsulates said upper surface of said support plate.

8. An improved method for positioning and leveling a large profile or small profile screed control guide joint for the placement of concrete on any type of substrate, said screed control guide joint formed of extruded polymer and having a base, an upward standing ridge of triangular cross section terminating in an upper linear edge, the method comprising:
   a. positioning upstanding pieces of rebar in an aligned orientation in the substrate to be overlaid with concrete;
   b. positioning an exteriorly threaded tubular cap member having a plurality of internal ribs in frictional engagement with the upper portion of said upstanding piece of rebar;
   c. securing a clip member to said exteriorly threaded tubular cap member, said clip member having a tubular base having an internal thread rotatably engageable with said exterior threaded cap member, said tubular base having a unitarily formed first dovetail channel formed on an upper surface thereof, said first dovetail channel formed of a base and opposing upstanding edges defining said dovetail channel, said dovetail channel dimensioned to snap fittingly receive a base of a large profile screed control guide joint, said clip member having a second dovetail channel secured to said base of said first dovetail channel, said second dovetail channel having a base and opposing upstanding edges snap-fittingly engageable in said first dovetail channel, said second dovetail channel having opposing interior upstanding prongs dimensioned to snap-fittingly receive a small profile screed control guide joint;
   d. rotating said clip member on said exteriorly threaded tubular cap member to achieve equivalent heights of all said clip members secured to said exterior threaded tubular cap members on said pieces of rebar;
   e. snap fitting said base of said screed control guide joint into said plurality of aligned and leveled clip members; and
   f. placement of said concrete onto said substrate to the height of said upper linear edge of said screed control guide joint.

9. The improved method in accordance with claim 8 wherein said second dovetail channel secured to said base of said first dovetail channel is hingeably secured to said base of said first dovetail channel with said opposing upstanding edges and opposing interior upstanding prongs oriented downwardly, said second dovetail channel hingeably rotated 180 degrees to engage said first dovetail channel.

10. The improved method in accordance with claim 8 wherein said second dovetail channel secured to said base of said first dovetail channel is secured by an elongate flexible hinge arm wherein said second dovetail channel and said opposing edges and said opposing interior upstanding prongs are oriented upwardly, said elongate hingeable arm permitting planar rotation of 180 degrees in order to engage said first dovetail channel.

11. The improved method in accordance with claim 8 wherein said plurality of internal ribs on said exterior threaded tubular cap member are radially oriented within said threaded tubular cap member.

12. The improved method in accordance with claim 8 wherein said plurality of internal ribs within said threaded tubular cap member are non-radial in orientation within said threaded tubular cap member.

13. The improved method in accordance with claim 8 wherein said clip member is rotatably adjustable on said exterior threaded tubular cap member for adjustment of height of said clip member for receipt of a screed control guide joint length of either large profile or small profile.

14. The improved method in accordance with claim 8 wherein said end portion of rebar frictionally engageable with said exterior threaded tubular cap member is supported by a substrate engaging base member, said substate engaging base member having a planar support base having an upper surface and a lower surface there being disposed between said upper and lower surface a plurality of apertures, there being positioned on said upper surface and unitary therewith, a tubular upstanding support tube for the receipt of a lower end of said rebar, said support base secured to said substrate by an adhesive applied to the lower surface of the support base or to the substrate, in a quantity such that sets adhesive flows through said plurality of apertures and adheres to and encapsulates said upper surface of said support plate.

* * * * *